(12) United States Patent
Fink

(10) Patent No.: US 7,735,853 B2
(45) Date of Patent: Jun. 15, 2010

(54) SIDE CURTAIN AIR BAG DEFLECTOR BRACKET

(75) Inventor: Cari Fink, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 275 days.

(21) Appl. No.: 11/938,882

(22) Filed: Nov. 13, 2007

(65) Prior Publication Data
US 2008/0252047 A1 Oct. 16, 2008

Related U.S. Application Data

(60) Provisional application No. 60/866,944, filed on Nov. 22, 2006.

(51) Int. Cl.
*B60R 21/22* (2006.01)
*B60R 21/16* (2006.01)
(52) U.S. Cl. .................................. 280/728.2; 280/730.2
(58) Field of Classification Search .............. 280/728.2, 280/730.2
See application file for complete search history.

(56) References Cited

U.S. PATENT DOCUMENTS

| | | | | |
|---|---|---|---|---|
| 6,224,089 | B1 * | 5/2001 | Uchiyama et al. | 280/728.2 |
| 6,340,169 | B1 * | 1/2002 | Tietze | 280/728.2 |
| 6,705,636 | B2 * | 3/2004 | Takahara | 280/728.2 |
| 6,793,241 | B2 | 9/2004 | Wallner et al. | |
| 7,077,424 | B2 * | 7/2006 | Inoue | 280/730.2 |
| 7,097,200 | B2 * | 8/2006 | Wold | 280/730.2 |
| 7,175,196 | B2 * | 2/2007 | Boxey | 280/730.2 |
| 2005/0046154 | A1 * | 3/2005 | Rhea et al. | 280/728.2 |
| 2005/0173902 | A1 * | 8/2005 | Boxey | 280/730.2 |
| 2005/0225060 | A1 | 10/2005 | Wold | |
| 2006/0267315 | A1 * | 11/2006 | White | 280/730.2 |
| 2009/0091102 | A1 * | 4/2009 | Okimoto | 280/728.2 |
| 2009/0160165 | A1 * | 6/2009 | Torii | 280/730.2 |
| 2009/0184494 | A1 * | 7/2009 | Dominissini et al. | 280/728.2 |

FOREIGN PATENT DOCUMENTS

| JP | 2002067860 | | 3/2002 |
|---|---|---|---|
| JP | 2003285697 | A * | 10/2003 |

\* cited by examiner

*Primary Examiner*—Paul N Dickson
*Assistant Examiner*—Drew Brown
(74) *Attorney, Agent, or Firm*—Mark E. Duell; Rankin, Hill & Clark LLP

(57) ABSTRACT

A side curtain air bag deflector bracket is provided. A powerful inflator is used that quickly fills a large side curtain air bag. Where an inflator pipe meets the air bag, there is a tendency for the air bag to deflect upwards due to the high volume of air being introduced into the bag in a short period of time. The bracket deflects the side curtain air bag so that, during this type of expansion the air bag can not migrate up into the roof lining structure of the vehicle. The bracket includes a first portion with an arched deflector that deflects the air bag, during expansion, along a path that is close to the surface of the vehicle door. The bracket also includes a second portion that includes a mounting flange and transverse deflector oriented transversely to the arched deflector.

15 Claims, 4 Drawing Sheets

SIDE CURTAIN AIR BAG DEFLECTOR BRACKET

BACKGROUND OF THE INVENTION

Modern vehicles are designed to provide a substantial degree of safety to passengers. One way in which this is done is by including air bags to cushion the passengers during collisions. Air bags were first employed in front of either the driver, front seat passenger or both. Side curtain air bags have also been introduced and protect the vehicle occupants from injury during a side impact collision, rollover collision, or other accident where the passengers are made to move laterally.

Because a side curtain airbag must cover more area that a typical dashboard air bag, the side curtain air bag is larger in size. However, such an air bag must be inflated at a speed that is comparable to dashboard-configured air bags. As a result, the inflator size and gas output velocity used for the side curtain air bag is typically much larger than that of a dashboard-configured inflator and must be strategically placed. Also, because the side curtain air bag is larger than dashboard-configured airbags, the direction of the deployment must be controlled to optimize its effectiveness during a collision. Controlling placement and deployment direction is rendered more difficult due to limited space along a vehicle's roofline, where the air bag is stored.

Additionally, unlike dashboard mounted air bags that deploy directly toward a vehicle occupant, it is desirable for a side curtain air bag to deploy downward, and as close to the side interior of the vehicle as possible. This path avoids an inadvertent collision with the vehicle occupant while the airbag is still in the process of deploying and also ensures the most significant coverage of the side interior of the vehicle.

What is desired is an air bag deflector bracket that assists in deployment by keeping a deploying air bag fully within the passenger compartment and close to the side interior of a vehicle and also has a configuration that allows the air bag inflator to be placed in an optimal position.

BRIEF SUMMARY OF THE INVENTION

The present invention meets the needs described above by providing a side curtain air bag deflecting bracket. The bracket allows the side curtain air bag inflator and inflator pipe to be placed in an optimal position. Specifically, the inflator pipe is located approximately at the center of the length of the airbag, so the air bag can be filled from two sides of the pipe, quickly. The pipe enters the air bag and expels a large amount of gas both in a forward and rearward direction, simultaneously. Because of this central location, the bag is filled faster that if the inflator pipe was located close to either end of the length of the air bag. The inflator is located adjacent to the inflator pipe, preferably on a side toward the rear of the vehicle.

The bracket also deflects the side curtain air bag, as it is being deployed so that, during expansion, the air bag does not extend into the roof liner of the vehicle. This protection is required directly adjacent to the position where the inflator pipe enters the airbag, as gas velocity and force generated by the entering gas is highest here. As a result of the bracket, the air bag remains generally parallel to and near the surface of the front and rear passenger or driver door.

The bracket includes a first portion that has a back panel that is affixable to the roof of the vehicle. The first portion also includes an arched deflector that blocks the air bag, during expansion, and guides the air bag along a path that is close to the surface of the vehicle door. The bracket includes a second portion that is attached to or is integrally formed with the first portion. The second portion includes a mounting flange and a transverse deflector adjacent to the mounting flange. The shape of the bracket portion may be varied based on changes in the interior styling of the vehicle.

These and other aspects of the invention are herein described in particularized detail with reference to the accompanying figures.

DETAILED DESCRIPTION OF THE INVENTION

Figure 1:
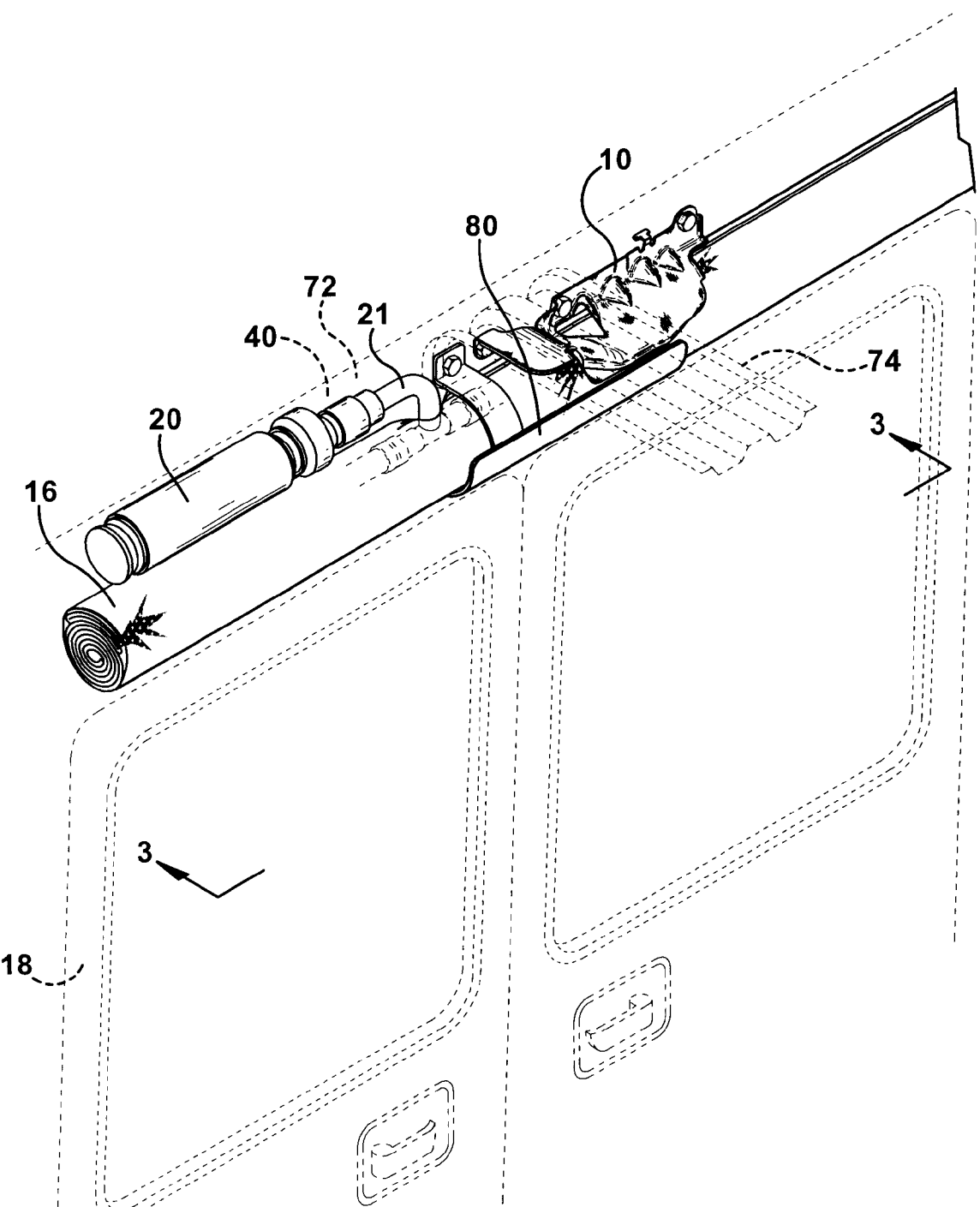
FIG. 1 is a perspective view of a side curtain air bag bracket and inflator of the present invention installed on a vehicle over a side curtain air bag.

Referring to the drawings, specifically FIGS. 1 and 4-7, a preferred side curtain air bag deflecting bracket 10 is illustrated. The bracket 10 includes, as described in more detail below, a first portion 12 and a second portion 14. The bracket 10 effectively deflects an deploying side curtain air bag 16 so that the air bag 16 remains generally parallel to and in close proximity to a vehicle door(s) 18 during expansion and does not expand into the roof lining of the vehicle.

The first portion 12 includes a back panel 22 that is flat. The back panel 22 defines a first aperture 24. The back panel 22 also includes a flange 26 that defines a second aperture 28. A clip 30 extends vertically from the top 32 of the back panel 22 and is bent such that a T-shaped head 34 of the clip 30 is perpendicular to the back panel 22. An arched deflector 36 extends downwardly from the bottom 38 of the back panel 22 and in a direction that is away from the vehicle roof 40 when the bracket 10 is in an installed position. When viewed from the top of the bracket 10, the arched deflector 36 is convex. Preferably, the radius of curvature of the arched deflector remains constant along its length. The arched deflector 36 defines an access hole 42 at an end 44 of the first portion 12 that is adjacent the second portion 14 of the bracket 10. The access hole 42 has a generally triangular shape wherein the points of the triangle are rounded. Several strengthening ribs 45 overlap both the back panel 22 and arched deflector 36. The ribs 45 are teardrop shaped with the narrower end 46 extending onto the arched deflector 36. A rounded, reinforced edge 48 extends along an end 50 of the first portion 12, opposite the second portion 14, and approximately half way along the end 52 of the arched deflector 36 opposite the second portion 14 of the bracket 10.

Figure 4:
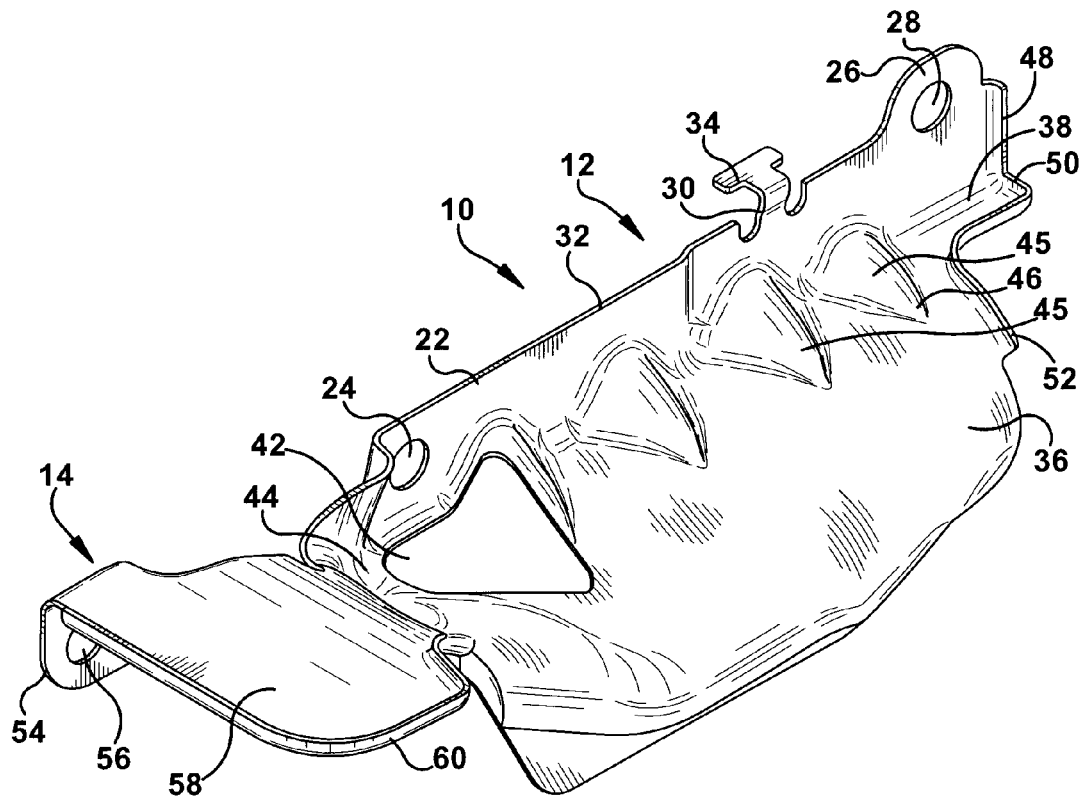
FIG. 4 is a perspective view of the bracket.
Figure 5:
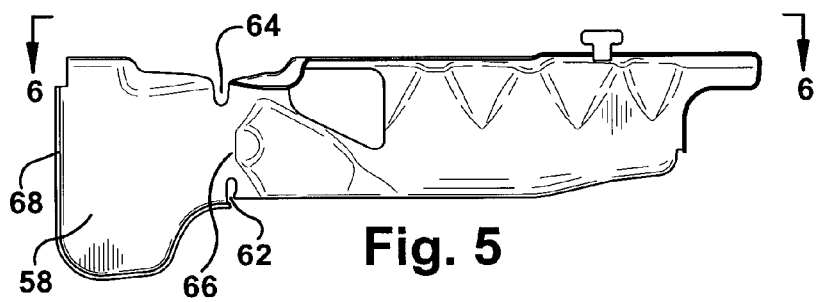
FIG. 5 is a top view of the bracket.
Figure 6:
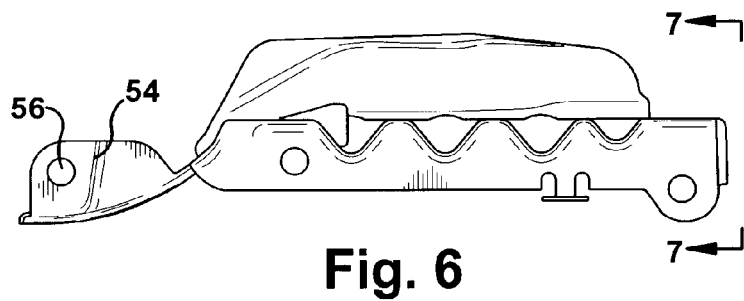
FIG. 6 is a rear view of the bracket.
Figure 7:
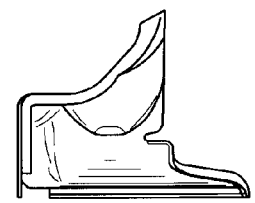
FIG. 7 is a side view of the bracket.

The second portion 14 includes a flange 54, that defines a mounting aperture 56, and a transverse deflector 58. Referring to FIG. 4, the transverse deflector 58 has a generally square shape when viewed from the top. The transverse deflector 58 is arched in a direction that is generally transverse to the arch of the arched deflector 36 on the first portion 12 of the bracket 10. The transverse deflector 58 follows the curvature of the inflator pipe. The front edge 60 of the transverse deflector 58 tapers inwardly as the first portion 12 of the bracket 10 is approached. This edge tapers to prevent the air bag tearing on the edge of the transverse deflector 58. Two notches 62 and 64 are on opposite sides of the junction 66 of the first portion 12 and second portion 14 of the bracket. The edge 68 of the second portion 14 opposite of the junction 66 with the first portion 12 as well as the front edge 60 of the second portion 14 are reinforced. Reinforcement is provided by folding over the edge or by other means well known in the art. Preferably, all of the perimeter edges of the first portion and second portion are rounded if not reinforced, or in addition to reinforcement, so if and when the air bag contacts the edge, the air bag is not torn.

Figure 2:
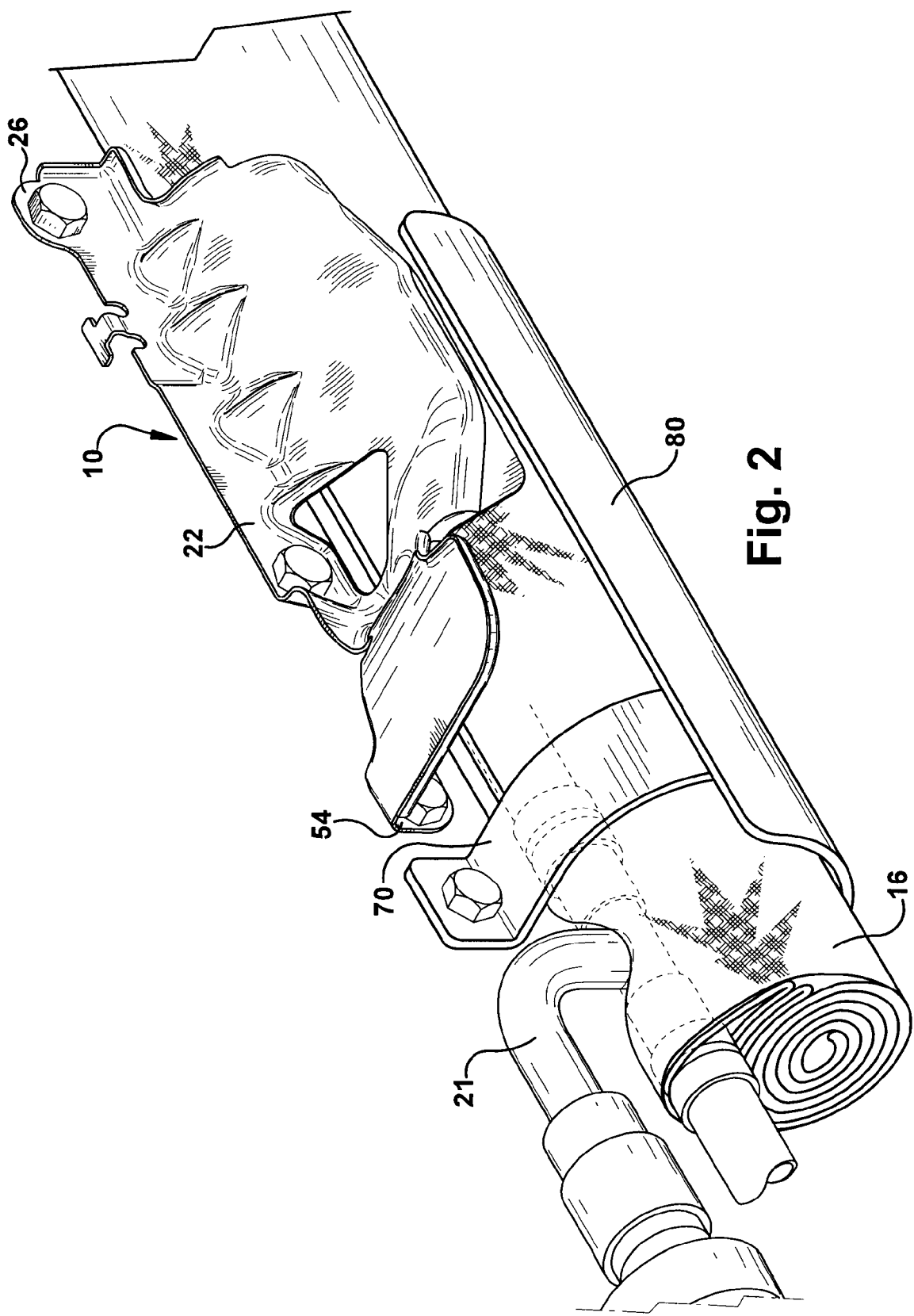
FIG. 2 is a perspective view of the side curtain air bag, inflator pipe and bracket.

Referring to FIGS. 1, 2 and 4, a J-hook 70 may optionally be used in combination with the bracket 10. The J-hook 70 is of a type well known in the art.

The bracket 10 and J-hook 70 are attached to the vehicle roof along the roofline 40. As known in the art, the vehicle roofline 40 comprises a generally vertical portion 72 that is in line with the side of the vehicle and a generally horizontal portion 74 that is in line with the roof of the vehicle. The roofline 40 refers to both these portions of the roof. The junction of the vertical portion 72 and horizontal portion 74 may be rounded. The bracket 10 is attached to the vertical portion 72 of the roofline 40, preferably using bolts. One bolt is placed through each of the apertures 24 and 28 defined in the first portion of the bracket. Another bolt is placed through the aperture 56 defined in the flange 54 of the second portion 14 of the bracket 10.

Preferably, the bracket 10 is installed before the side curtain air bag 16 is installed on the vehicle. As is well known in the art, the air bag 16 is installed as a prefabricated and rolled assembly. Tape is typically used to keep the air bag 16 in a stable, rolled condition until deployment. The air bag, when rolled includes a Z-folded portion and a spiral rolled section. A plastic C-channel 80 is placed around a portion of the air bag 16 adjacent to the bracket 10 in order to prevent damage to the air bag 16 upon installation. The transverse deflector 58 of the bracket second portion 14 is configured adjacent to the inflator pipe 21 of the side curtain air bag inflator 20. The inflator pipe 21 has a T-shape which includes forward and rearward facing gas ports. The inflator 20 is of a type well known in the art and can emit large amounts of gas quickly.

The bracket 10 is preferably made from steel, but may be formed from aluminum or a composite metal. The bracket is located generally over the junction between the two vehicle side doors. Preferably, the vehicle does not include a B-pillar.

Figure 3:
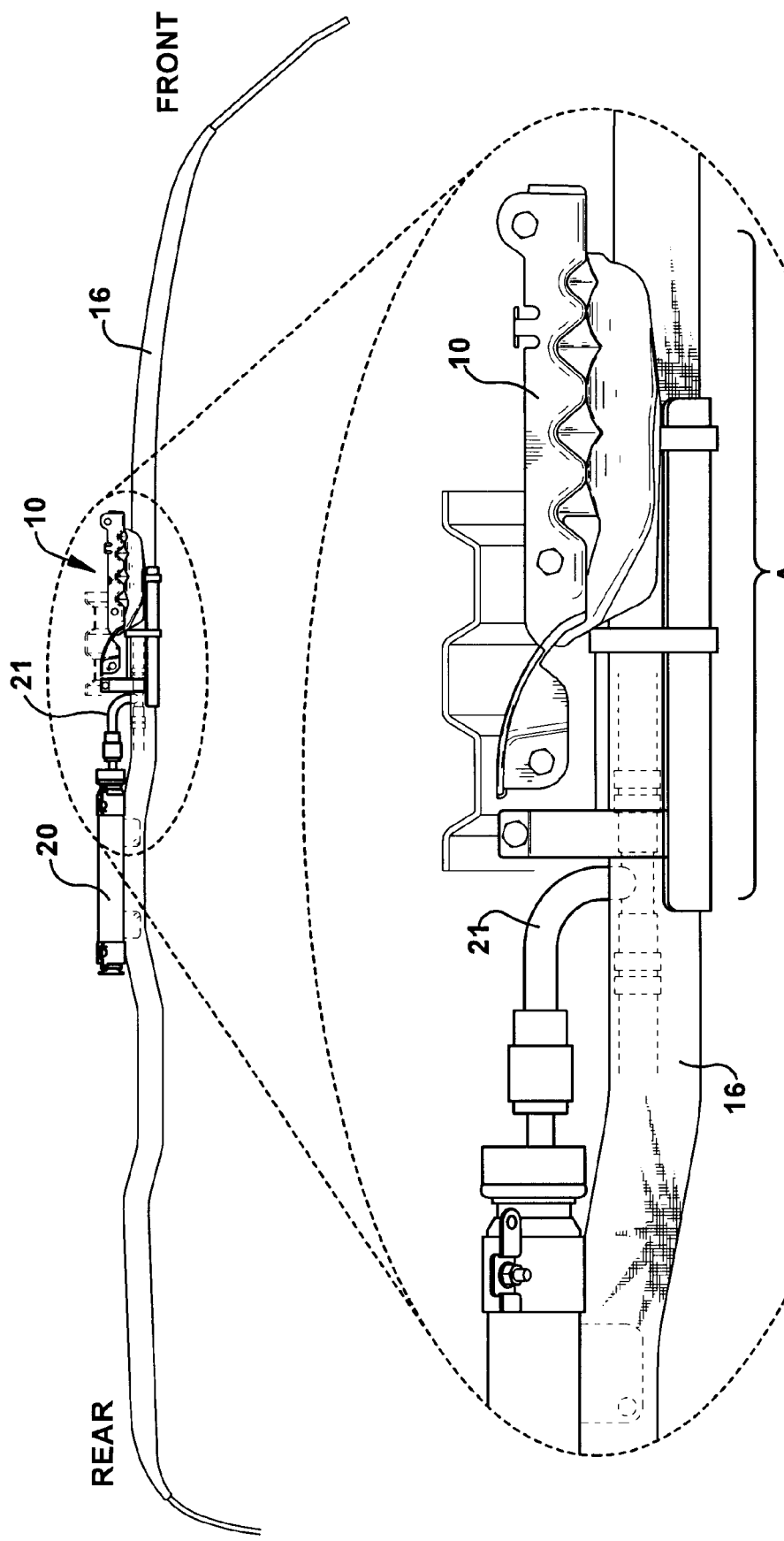
FIG. 3 is a schematic side view of the complete air bag and the relative configuration of the bracket.

At the outset of a collision, air is provided from the inflator 20, through both ports of the inflator pipe 22 into the air bag 16. The air bag 16 unrolls toward the vehicle interior side. Referring to FIGS. 1-3, as the air bag 16 is inflating, especially near the inflator pipe 22, a portion "A" of the air bag 16 will have a tendency to move upwards. In this position, the air bag 16 is blocked by the bracket 10 and is not allowed to enter the roof liner. Also, the air bag 16 is prevented from pushing out at an angle with respect to the vehicle doors 18, but instead remains generally parallel to the vehicle side interior. The J-hook 70 provides additional stability to the air bag. The transverse deflector provides clearance for vehicle interior components. The transverse deflector 58 additionally functions to protect the inflator from being moved or otherwise disengaged.

The invention provides a bracket that is easily installed on a vehicle in a position that will be over a side curtain air bag after air bag installation. The air bag includes an inflator that has been placed in an optimal position. The bracket efficiently deflects the air bag, as it expands.

The bracket may be used on either a vehicle including a B-pillar or in a vehicle without a B-pillar, as shown.

Although the invention has been shown and described with reference to certain preferred and alternate embodiments, the invention is not limited to these specific embodiments. Minor variation sand insubstantial differences in the various combinations of materials and methods of application ay occur to those of ordinary skill in eh art while remaining within the scope of the invention as claimed and equivalents.

What is claimed is:

1. An automobile side curtain air bag deflecting bracket comprising:
a first portion including a back panel affixable to a vehicle roof and an arched deflector formed together with the back panel; and
a second portion attached to the first portion and including a mounting flange and a transverse deflector formed together with the mounting flange, wherein the transverse deflector is arched in a direction generally transverse to the arched deflector of the first portion and wherein the transverse deflector provides clearance for an interior vehicle component;
wherein a front edge of the transverse deflector tapers inwardly as the second portion approaches the first portion so as to prevent an expanding air bag from tearing on the bracket.

2. The automobile side curtain air bag deflecting bracket of claim 1, wherein the bracket is configured to be installed directly above the position where a front door and passenger door abut when closed on a vehicle lacking a B-pillar.

3. The automobile side curtain air bag deflecting bracket of claim 1, wherein the bracket is configured to be installed directly adjacent to the position where the airbag inflator pipe enters the air bag.

4. The automobile side curtain air bag deflecting bracket of claim 1, wherein the arched deflector has a generally constant radius of curvature along a length of the arched deflector.

5. The automobile side curtain air bag deflecting bracket of claim 1, wherein the second portion is vertically higher than the first portion when the bracket is installed in a vehicle.

6. The side curtain air bag deflecting bracket of claim 1, wherein several strengthening ribs overlap both the back panel and arched deflector of the first portion.

7. The side curtain air bag deflecting bracket of claim 1, wherein a front edge of the first portion is rounded so as to prevent an expending air bag from tearing on the bracket.

8. An automobile side curtain air bag system comprising:
a side curtain air bag; and
an air bag inflator including an inflator pipe the enters the side curtain air bag at about the midpoint of its length;
an air bag deflecting bracket configured adjacent to the inflator pipe whereby when the air bag is deployed the bracket prevents the air bag from expanding into the roof lining area of the automobile;
wherein the air bag deflection bracket includes:
a first portion including a back panel affixable to a vehicle roof and an arched deflector formed together with the back panel; and
a second portion attached to the first portion, offset from the first portion in a direction along the length of the airbag, and including a mounting flange and a transverse deflector formed together with the mounting flange, wherein the transverse deflector is arched in a direction generally perpendicular to the arched deflector of the first portion.

9. The automobile side curtain air bag system of claim 8, wherein the bracket is configured to be installed directly above the position where a front door and passenger door abut when closed on a vehicle lacking a B-pillar.

10. The automobile side curtain air bag system of claim 8, wherein the bracket is configured to be installed directly adjacent to the position where the airbag inflator pipe enters the air bag.

11. The automobile side curtain air bag system of claim 8, wherein the arched deflector has a generally constant radius of curvature along a length of the arched deflector.

12. The automobile side curtain air bag system of claim 8, wherein the second portion is vertically higher than the first portion when the bracket is installed in a vehicle.

13. The side curtain air bag system of claim 8, wherein several strengthening ribs overlap both the back panel and arched deflector of the first portion.

14. The side curtain air bag system of claim 8, wherein a front edge of the transverse deflector tapers inwardly as the second portion approaches the first portion so as to prevent an expanding air bag from tearing on the bracket.

15. The side curtain air bag system of claim 14, wherein a front edge of the first portion is rounded so as to prevent an expending air bag from tearing on the bracket.

* * * * *